May 7, 1963 W. R. COWAN ETAL 3,088,349
POWER-OPERATED, MULTISTAGE, PREDETERMINED TORQUE RELEASE WRENCH
Filed Oct. 26, 1959 6 Sheets-Sheet 1

Fig.1

INVENTOR
WILLARD R. COWAN
CHARLES W. WHITE

BY Beaman & Beaman

ATTORNEY

Fig. 2

INVENTOR
WILLARD R. COWAN
CHARLES W. WHITE
BY Beaman & Beaman
ATTORNEY

INVENTOR
WILLARD R. COWAN
CHARLES W. WHITE

BY Beaman & Beaman
ATTORNEY

May 7, 1963 W. R. COWAN ETAL 3,088,349
POWER-OPERATED, MULTISTAGE, PREDETERMINED TORQUE RELEASE WRENCH
Filed Oct. 26, 1959 6 Sheets-Sheet 5

INVENTOR
WILLARD R. COWAN
CHARLES W. WHITE
BY Beaman & Beaman
ATTORNEY

Fig. 8

INVENTOR
WILLARD R. COWAN
CHARLES W. WHITE

3,088,349
POWER-OPERATED, MULTISTAGE, PREDETERMINED TORQUE RELEASE WRENCH
Willard R. Cowan, Jackson, and Charles W. White, Clark Lake, Mich., assignors to Aeroquip Corporation, Jackson, Mich., a corporation of Michigan
Filed Oct. 26, 1959, Ser. No. 848,739
16 Claims. (Cl. 81—52.4)

The invention relates to a torque or wrench machine, and particularly pertains to a torque machine for assembling threaded members which is capable of very accurately and quickly producing a predetermined torque each cycle of operation.

In the assembly of manufactured articles wherein components are threaded together, it is often desired that the torque exerted on the threaded members be accurately controlled, and manually operated torque wrenches are usually employed for this purpose. In high speed assembly processes, machines have been developed which employ motor means to produce the torque, and although many of the known torque machines incorporate means to regulate the degree of torque produced, conventional machines are not consistent in their operation from cycle to cycle in that inertia forces and other factors common to conventionally designed machines make accurate regulation of the actual torque produced most difficult. While many conventional torque machines will tighten bolts, nuts, and other threaded elements, within plus or minus 5 ft. lbs. of the desired torque, these machines will not be accurate to 1 or 2 ft. lbs. of torque as is often necessary in the assembly of high pressure flexible hose fittings and other critical assembly operations.

It is, therefore, the primary object of the invention to provide a high production wrench or torque machine which is capable of maintaining close torque tolerances and which will consistently maintain such tolerances through many cycles of operation.

Another object of the invention is to provide a high production torque machine which is pneumatically operated and which is semiautomatic in operation such that rotation of the wrench head is under the full control of the control mechanism of the machine and the operator merely initiates the various phases of operation.

A further object of the invention is to provide a torque machine employing a multispeed air motor for the preliminary engagement of the threaded components to be assembled and a cylinder-rack construction to provide the final torque.

Yet another object of the invention is to provide a torque machine in which the torque may be accurately regulated by setting the control apparatus to predetermined values, and inertia forces acting on the rotating components of the machine are substantially eliminated.

It is also an object of the invention to provide a high production torque machine which may easily be set up for various jobs and wherein the final torque producing cylinder may be quickly interchanged with different size cylinders to obtain a wide range of final torque values.

A further object of the invention is to provide a torque machine employing a rotary air motor having high and low speeds to perform the initial "run on" and preliminary torque and a cylinder operated rack to produce the final torque whereby the motor and rack rotate a common drive shaft.

Another object of the invention is to provide a torque machine utilizing a rotatably mounted vise whereby the torque exerted on the vise may be indicated.

Yet another object of the invention is to provide a torque machine using a linearly movable rack to produce final torquing wherein the rack will automatically recycle until the desired torque is obtained.

These and other objects of the invention arising from the structural details and arrangement of the components thereof will become apparent from the following description and accompanying drawings, wherein:

Figure 1:
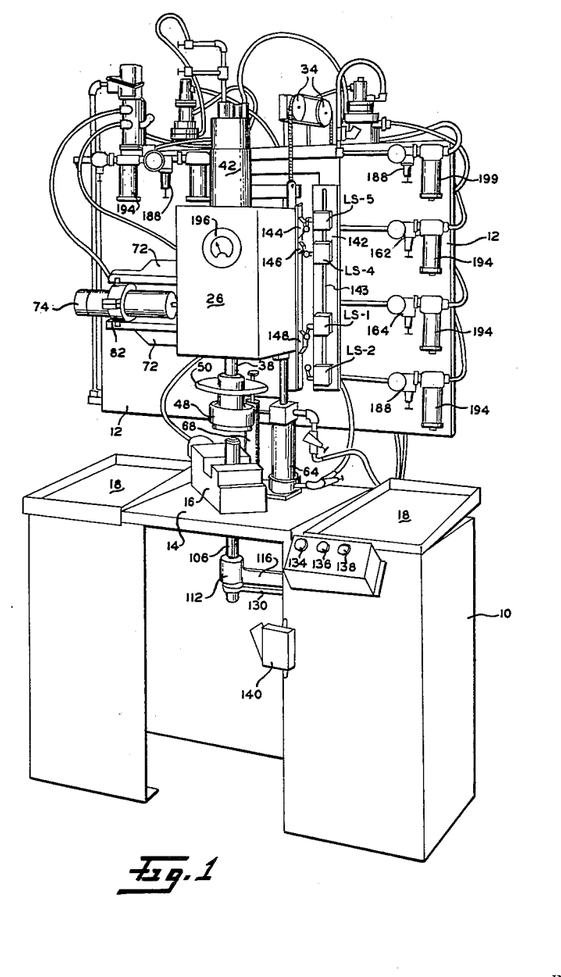
FIG. 1 is an elevational perspective view of the torque machine of the invention.

While the principles of the invention may be employed in torque machines of many constructions, it will be convenient to illustrate the concept thereof in a single embodiment, and this embodiment preferably takes the form of the machine illustrated in FIG. 1. The illustrated machine was constructed for the purpose of assembling threaded members such as those employed in reusable hydraulic fittings. However, it will be apparent that the principles and operation of the machine may be employed in any application wherein two members are threaded together.

Referring to FIG. 1, the basic components of the machine will be apparent wherein a base 10 of generally rectangular configuration is employed to support a vertically extending back panel 12. The central portion 14 of the base 10 serves to support the vise 16 and the pneumatic actuating cylinders for the drive shaft housing, and means are provided at the ends 18 of the upper base portions to receive trays which accommodate the parts to be assembled.

Figure 2:
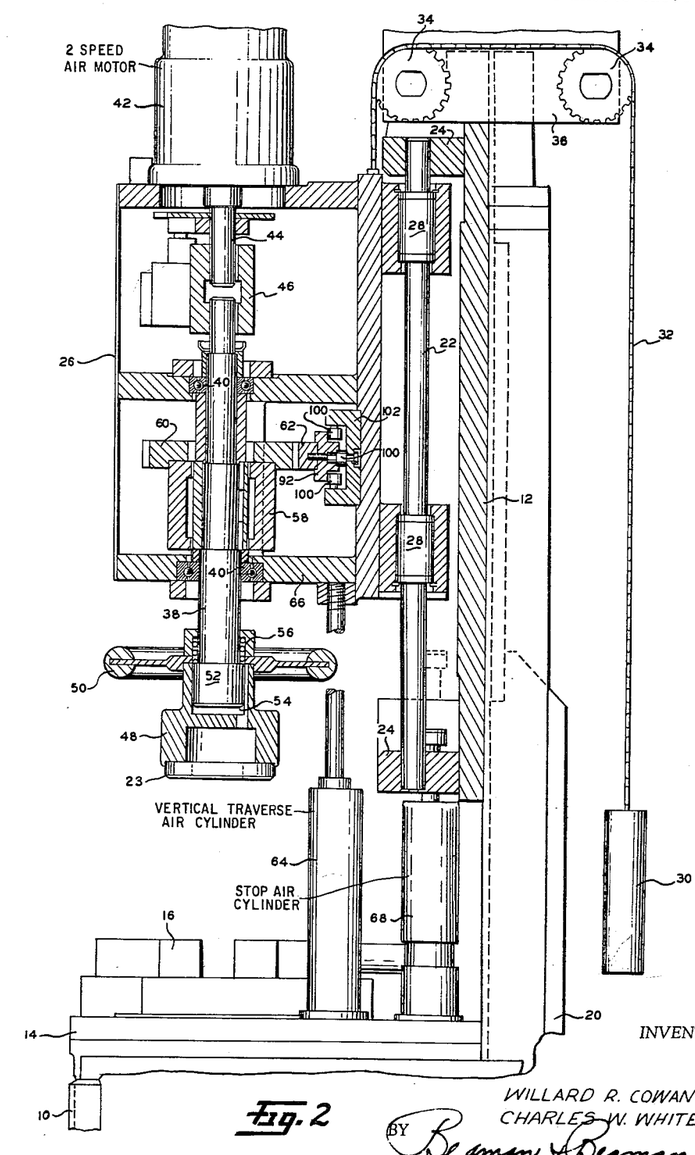
FIG. 2 is a side elevational view in section of the upper regions of the machine of the invention taken through the main drive shaft and housing.

Referring to FIG. 2, the vertical elements 20 which support the back panel 12 will be apparent, and the back panel supports a pair of vertical guide rods 22, one of which is shown, upon bearing blocks 24. A drive shaft housing 26 is supported upon the guide rods 22 by means of antifriction bearings 28 which permit the housing to be easily translated vertically. As will be apparent from FIG. 2, means are provided to counterbalance the weight of the housing 26, and these means include a counterweight 30, affixed to a chain 32, which is threaded over sprockets 34, rotatably journaled on a support member 36 affixed to the panel 12.

The drive shaft 38 of the torque machine is enclosed within the housing 26 and is rotatably supported within this housing upon antifriction bearings 40. An air motor 42 of the piston type which has a 2-speed adjustment, as will be explained later, is mounted upon the top of the housing 26, whereby the output shaft 44 is concentrically arranged with the drive shaft 38. The output shaft of the air motor is coupled to the drive shaft 38 by a coupling 46. The lower end of the drive shaft 38 projects below the housing and is provided with a wrench head device 48 for producing the connection to one of the parts to be threadedly assembled. The wrench head 48 includes an annular hand wheel 50 for permitting manual rotation of the drive shaft, and while the wrench head 48 is keyed to the shaft 38, clearance is provided between the head 52 of the drive shaft and the recess 54 defined in the wrench to receive the head 52, whereby relative axial movement between the wrench head 48 and drive shaft 38 is permitted. A spring 56 interposed between the wrench head and the drive shaft head 52 exerts an upward force on the wrench head 48 whereby the wrench head is in effect "floating" on the drive shaft.

A one-way clutch 58 is concentrically arranged on the drive shaft 38 intermediate the antifriction bearings 40, and is related to the drive shaft whereby rotation of the clutch in a right-hand direction will rotate the drive shaft in a like direction. A gear 60 is affixed to the unidirectional clutch 58, and engages a rack 62 for a purpose which will be later disclosed.

The vertical translation of the housing 26 is accomplished through a pneumatic cylinder 64 which is interposed between the lower plate 66 of the housing and the central portion 14 of the machine base. The cylinder 64 is of the double acting type and controls the vertical position of the housing 26 and wrench head 48 during the machine operation. A stop cylinder 68 is also mounted upon the central portion 14 of the machine base, and this cylinder is centrally located under the housing to engage a housing abutment element, not shown. Stop cylinder 68 is of the single acting type having an upward power stroke.

Figure 3:
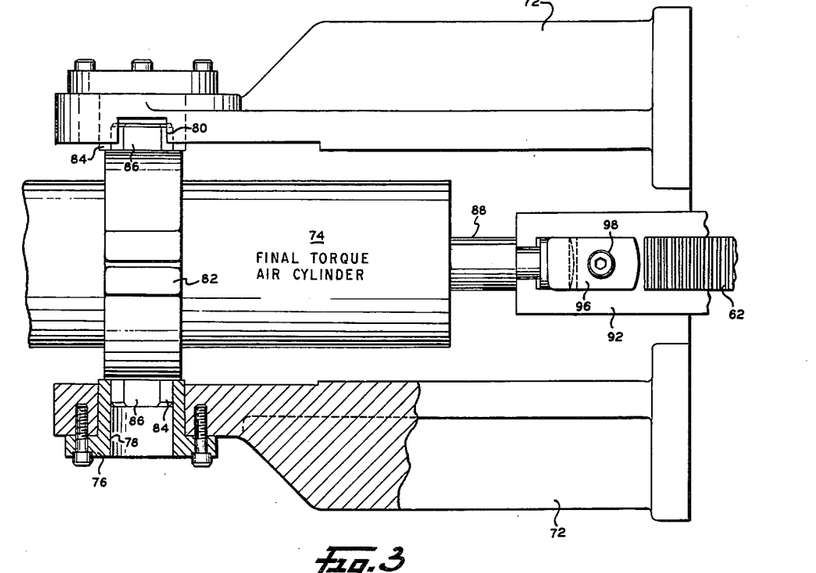
FIG. 3 is an elevational view, partly in section, of the rack cylinder and the means for maintaining the same in position upon the shaft housing.
Figure 4:
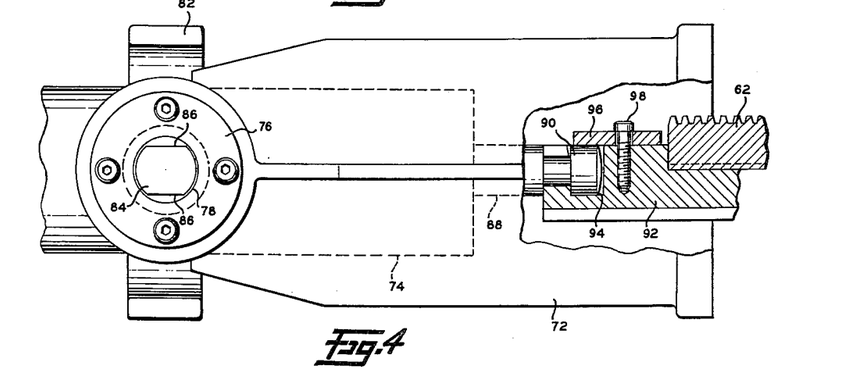
FIG. 4 is a plan view of the rack cylinder taken from the top of FIG. 3, the rack structure being shown in section.

A pair of spaced horizontal support arms 72 are affixed to the left side, FIG. 1, of the housing 26, and are, in effect, an integral part thereof. These arms support the pneumatic cylinder 74 which actuates the rack 62, as will be later apparent. Referring to FIGS. 3 and 4, the means for mounting the pneumatic cylinder 74 will be explained. As it is desirable that the cylinder be easily assembled and disassembled in relation to the arms 72 and the rack, a quick disconnecting arrangement is employed for this purpose. To this end, a bearing member 76 is affixed to the end of each arm 72 adjacent the free end thereof, and this bearing member is provided with a circular bore 78. As best shown in FIG. 3, the inner portions of the bearings 76 are provided with a slot 80 intersecting the bearing bores 78 whereby this slot is disposed in a diametrical direction transverse to the direction of the arms 72. The cylinder 74 is supported in an annular collar 82 which circumscribes the cylinder, and is provided with diametrically arranged cylindrical studs 84 which are received within the bores of the bearings 76. The studs 84 are flattened on opposite portions thereof, whereby the diametrical distance between the flats 86 is slightly less than the width of the slot 80. Thus, by rotating the cylinder 74 relative to the arms 72, whereby the cylinder will be disposed at right angles thereto, the flats 86 will be aligned with the slots 80, and the studs 84 may be inserted into or removed from the bores of the bearings. When the studs and bearings are assembled as in FIGS. 3 and 4, alignment of the cylinder, as illustrated, will misalign the flats 86 with the slots 80 and the cylinder 74 will be pivotally affixed within the arms 72.

The piston rod 88 of the cylinder 74 is provided with a headed end 90, and this end is adapted to cooperate with the rack support guide 92. Referring to FIG. 4, it will be appreciated that the rack guide 92 is provided with a recess 94 which will receive the head 90 of the piston rod, and a cover element 96 pivotally mounted by a screw 98 may be pivoted to overlie the recess 94 and the piston head contained therein. Thus, by unloosening the screw 98 and pivoting the cover 96 to uncover recess 94, the piston head 90 may be easily slipped out of the rack guide recess. It will thus be appreciated that to install the hydraulic cylinder 74 upon the torque machine of the invention, the cylinder will be aligned at right angles to the arms 72, studs 84 are inserted into the bearing bores 78, the cylinder is rotated 90° until the piston rod head 90 is received in the recess 94, and upon placing the cover 96 over the recess and tightening screw 98, the cylinder will be fixed in position. The cylinder may be easily removed by reversing the above sequence of steps.

The cross-sectional configuration of the rack guide 92 is best shown in FIG. 2, wherein it will be noted that the rack guide is supported upon a plurality of rollers 100 mounted upon a bracket 102 fixed to the rear plate of the housing 26. The rack 62 is affixed to the guide by bolts or other suitable fastening means. Therefore, upon the introduction of pressurized air into the double acting cylinder 74, the rack 62 may be axially translated in either direction to rotate the gear 60 and clutch member 58.

Figure 5:
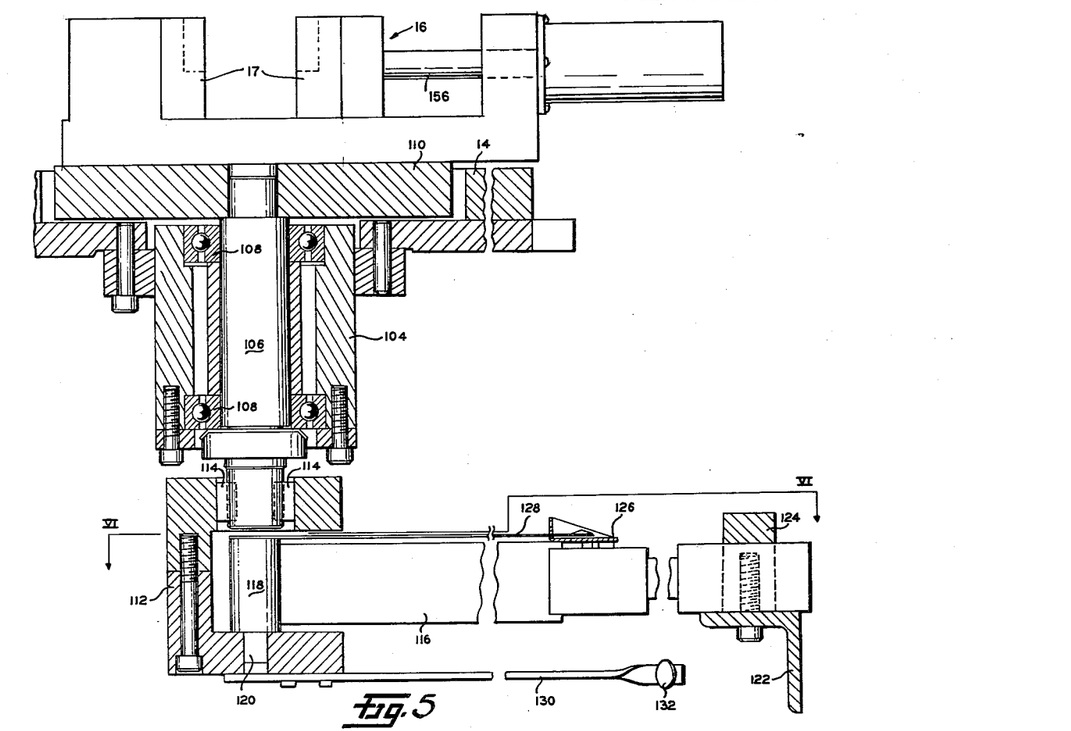
FIG. 5 is an elevational sectional view of the means supporting the vise, and includes the torque bar and torque indication means.
Figure 6:
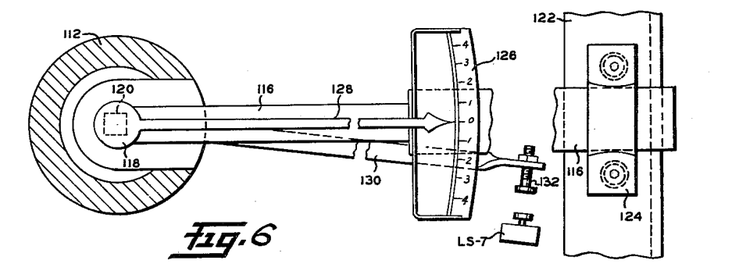
FIG. 6 is a plan sectional view of the torque indicating means taken along line VI—VI of FIG. 5.

The means mounting the vise structure upon the base portion 14 are best illustrated in FIGS. 5 and 6. The vise 16 is of the pneumatically operated type and may be of any commercially available design. Preferably, the vise is provided with interchangeable jaws 17, wherein jaw structure complementary to the parts to be readily assembled is provided, and as one of the parts 21 to be threaded is clamped within the jaws, it will be appreciated that the jaw elements of the vise concentrically arrange the threaded part 21 to the axis of the drive shaft 38. A bearing housing 104 is affixed to the under side of the portion 14 by means of bolts and pins, and a shaft 106 is rotatably journaled within this bracket upon antifriction bearings 108. The shaft 106 is keyed at the upper end to the plate 110 upon which the vise 16 is affixed. Thus, the vise is rotatably mounted upon the base 10 about the axis of shaft 106. The axis of shaft 106 coincides with the axis of the drive shaft 38.

The torque block 112 is keyed to the lower end of the shaft 106 by means of a pair of keying elements or splines 114, whereby the torque block is rigidly affixed to the shaft. A torque bar 116 radially extends from a boss 118 which is keyed to the block 112 by means of the rectangular projection 120. The torque bar 116 is affixed to a bracket 122 which is fixed upon the machine base 10. The torque bar is secured to the bracket 122 through a pivotable connecting block 124 which allows the torque bar to rotate slightly relative to the bracket, but prevents lateral movement of the bar relative thereto. An indicia scale 126 is affixed to the upper surface of the torque bar 116 at a point remote from the axis of shaft 106, and a pointer 128, affixed to the boss 118, overlies the indicia scale, whereby the degree of torque exerted upon the vise may be directly read. The torque arm, indicia scale, and indicating arm are of conventional construction and are well known in the torque indicating art. A switch actuating arm 130 is affixed to the lower surface of block 112 and radially projects below the torque bar. An axially adjustable abutment 132 is affixed to the end of the switch arm 130 for a purpose which will be later apparent.

The control of the machine is semiautomatic and is of the electric-pneumatic type wherein switches energize electromagnetically operated air valves. Basically, the operation is as follows: First, the wrench head 48 and vise 16 are provided with a socket 23 and jaws 17, respectively, which are custom fitted to the threaded parts to be assembled by the machine. These sockets and jaws are of the type that are easily affixed in position such that setting the machine up for a particular job is simplified.

The operator places the part 21 to be torqued together with the threaded part 25 into the vise jaws after the threaded connection of the parts has been hand started. Manual operation of a "start" switch causes the cylinder 64 to operate and move the housing 26 downward. On the way down, a cam mounted on the housing actuates a switch which causes the part 21 to be clamped in the vise, and downward movement continues until the housing engages the piston of the stop cylinder 68. At this time, the wrench head 48 will have engaged the unclamped threaded part 25, and as the configuration of the socket 23 within the wrench head has probably not aligned with the wrench surfaces or flats of the unclamped part 25, the spring 56 will be compressed to a slight extent. The operator now rotates the wrench head 48 via the hand wheel 50 to align the socket with the wrench surfaces of the unclamped threaded part 25 to effect the connection of the wrench head and part 25.

Closing of a knee operated switch allows the housing 26 to once again move downwardly, and a time delay relay starts a rapid rotation of the air motor 42 to rotate the wrench head and unclamped part 25 upon the clamped part 21. As the housing moves downwardly as the parts are screwed together, another switch is actuated which shifts the air motor into a low speed and low torque operation, whereby the last two or three turns are made under low speed conditions. When the air motor 42 stalls out, a switch is actuated by the operator which shuts off the air motor and activates the rack cylinder 74. The movement of the rack rotates the drive shaft and wrench head through the gear 60 and clutch 58. This operation rotates the drive shaft very slowly and only a very limited rotation of the wrench head by the rack is usually required to reach the desired torque.

The torque exerted by the rack operation may be accurately predetermined by regulating the air pressure within the rack cylinder 74, and rotation of the wrench head by the rack 62 is terminated upon equalizing of the force exerted by the rack cylinder and the connection of the threaded parts 21 and 25.

After the rack cylinder "stalls out," the operator energizes a retract switch, which causes the rack cylinder 74 to be retracted, pressurizes cylinder 64 to raise the housing 26 and wrench head 48 and unclamp the assembled part 21, 25.

The final torque produced by the rack cylinder and rack may be easily checked by observing the reading of the pointer 128 upon the scale 126. Means are also provided to produce recycling of the rack in the event the rack becomes fully extended before the desired torque is obtained, as in the case of a tight thread, whereby full extension of the rack actuates a recycle switch, as will be later described.

Figure 7:
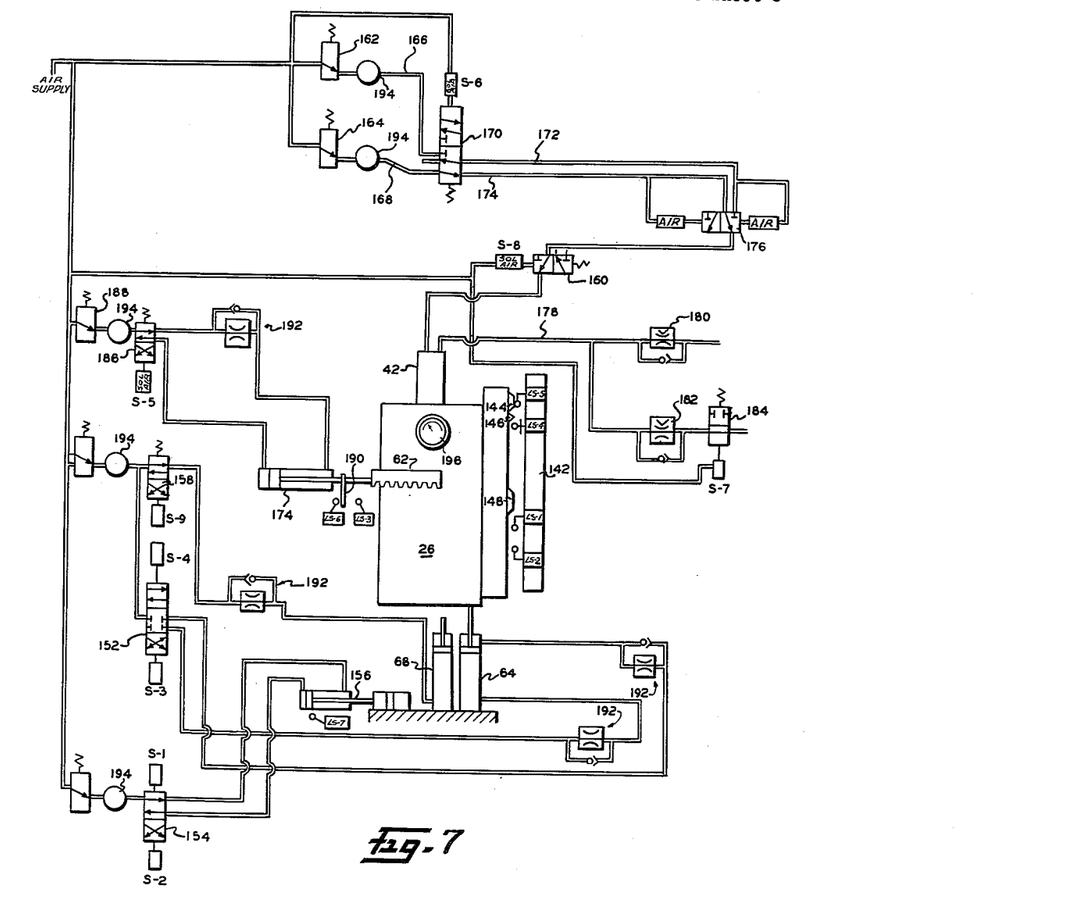
FIG. 7 is a diagrammatic illustration of the pneumatic system employed with the torque machine of the invention as related to the primary components thereof.
Figure 8:
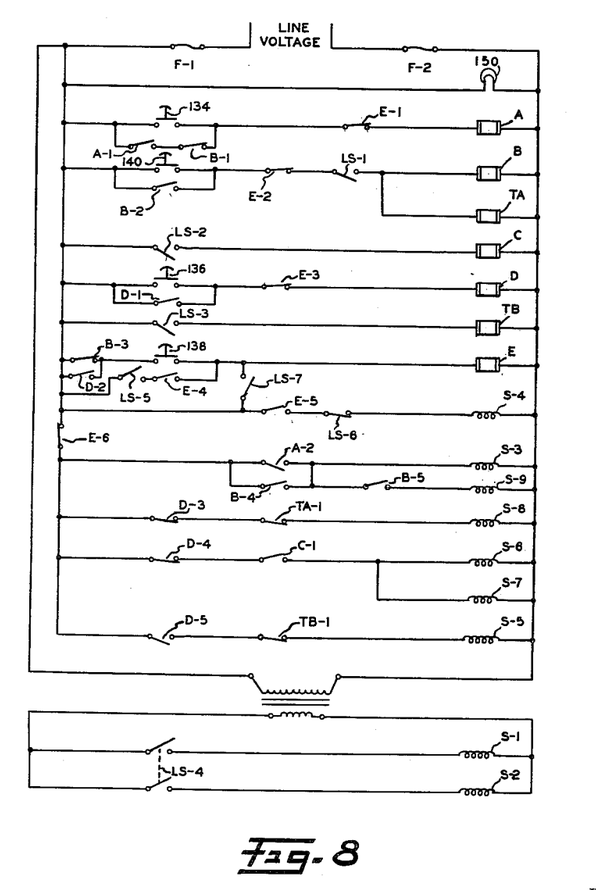
FIG. 8 is a diagram of the electrical system employed with the invention and FIG. 9 is a detail elevational view of the vise and wrench head as associated with the parts being assembled during assembly.
Figure 9:
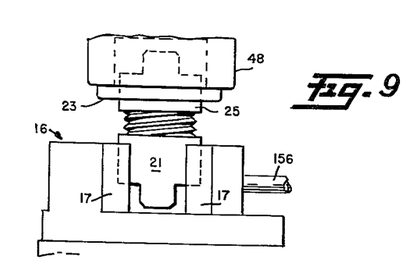

To describe the control system of the invention in detail, reference is made to FIG. 7, wherein the pneumatic components are illustrated in conjunction with the other machine structure, and FIG. 8 discloses the electric circuit arrangement. The control of the machine is effected primarily through a manually operated start switch 134, a rack forward switch 136, a retract or end of cycle switch 138, a knee switch 140, and a plurality of cam actuated switches LS–1, LS–2, LS–4 and LS–5. As will be apparent from FIG. 1, the manually operated switches are mounted at easily accessible locations on the machine base, and the cam operated switches are mounted upon a support 142 which is fixed upon the panel 12. The support 142 is provided with a vertical slot 143 or other means, whereby the vertical position of the switches LS–1, LS–2, LS–4 and LS–5 upon the support may be adjusted as desired such as by means of a thumb screw extending through the back of slot 143 and threaded into the switch.

In this manner, the vertical travel of the wrench head and the machine cycle may be varied, as is necessary with different assembling jobs. Three cam elements, 144, 146 and 148 are mounted upon the housing 26 adjacent the panel support mounted switches for the actuation thereof, and as the housing 26 moves downward, these cams will be engaged by the actuating arms of the switches. It will be apparent that the versatility of the machine obtained by adjustably mounted switches could likewise be accomplished by permanently locating the switches and adjustably positioning the cams 144 through 148.

The circuit controlling the operation of the machine may be supplied from a 110-volt alternating current line protected by fuses F–1 and F–2. In the description of the circuit, the conventional relays are designated by the letters A, B, C, D and E and the contacts of these relays are indicated by A–1, A–2, A–3, B–1, C–1, etc. Time delay relays are prefixed TA and TB having contacts TA–1, and TB–1. The valve operating solenoids are designated S–1, S–2, etc. The switch circuit employed with the solenoids operating the vise action is preferably of low voltage and, hence, a transformer is employed to step down the voltage of this portion of the circuitry.

Upon the energizing of the circuit, the indicating light 150 will indicate such condition, and the housing retract switch 138 is closed to insure that the components are all in the proper starting position to where they were returned at the end of the cycle before the machine was last shut off. Closing switch 138 energizes relay E, which closes E–5 to energize solenoid S–4, which actuates valve 152 to admit pressurized air into the bottom of cylinder 64 and raise the housing 26 to its uppermost position. When the housing 26 is in its upper position, the normally closed switch LS–5 opens upon engagement with cam 144 and de-energizes relay E. During upward movement, if any, of the housing 26, the interlock switch LS–6, which is normally open, will be held closed by the retracted rack since the rack operating solenoid S–5 is spring biased to a normal rack retracting position.

The operator may now position the hand started parts to be torque assembled in the jaws of the vise 16.

The "start" or "head down" switch 134 is then momentarily closed, which energizes relay A, closing contacts A–1 to maintain energization of relay A, and closing contacts A–2 to actuate solenoid S–3. Solenoid S–3 shifts 4-way valve 152 to the position which introduces air into the upper portion of cylinder 64 and thereby moves the drive shaft housing unit 26 downwardly upon the guides 22. As the housing 26 moves down toward vise 16, the cam 146 will momentarily close the switch LS–4, which energizes solenoid S–1, shifting 4-way valve 154 to the position which actuates piston rod 156 to clamp the parts within the vise jaws.

Downward movement of the housing continues, and prior to engagement of the lower housing portions with the stop cylinder 68 piston rod, the cam 148 actuates switch LS–1 to prepare the circuit for operation of the knee switch 140. The downward movement of the housing 25 ceases upon engagement of the housing with the stop cylinder piston rod, and at this location the wrench head 48 will be engaging the unclamped part to be assembled.

The operator now rotates hand wheel 50 to align the socket within the wrench head with the flats upon the unclamped threaded part. As mentioned above, upon alignment of the sockets and flats, the socket will axially slip over the part and an effective torque transmitting connection will be made.

The operator then closes switch 140 with his knee, which energizes relay B and time delay relay TA. Operation of relay B opens normally closed contacts B–1, but maintains energization of solenoid S–3 through the now closed contacts B–4. Relay B remains energized through the closing of contacts B–2; normally closed contacts B–3 open, and contacts B–5 close to energize solenoid S–9 to permit the spring biased normally open 3-way valve 158 to shift and retract the stop cylinder piston rod. The housing 26 and wrench head 48 continue to move downwardly and relay TA times in to open normally closed contacts TA–1, which de-energizes solenoid S–8 and permits spring biased normally closed 3-way valve 160 to shift.

The solenoid S–8 controls the air operated spring biased valve 160 which initiates the high speed, or "run down," rotation of the air motor 42; this rotation rapidly threads the part within the wrench head socket upon the vise gripped part. Referring to FIG. 7, the air motor control circuit is illustrated, and consists of a two-pressure inlet and outlet system for producing a high and a low speed operation. Air pressure regulators 162 and 164 are employed to predetermine the air pressure within conduits 166 and 168, connected to a 4-way, 5-port air operated valve 170 controlled by solenoid S-6. Valve 170 is spring biased, and upon actuation of solenoid S-6, the conduit 166 will communicate with conduit 172, or conduit 168 with conduit 174. Pressurization of either conduit 172 or 174 will actuate shuttle valve 176 and introduce air into valve 160. The pressure regulators 162 and 164 are usually set at different pressures, whereby conduit 172 will usually be of a higher pressure than conduit 174, and, thus, the higher pressure is injected into the air motor during high speed operation, and the lower pressure during low speed operation.

Although the air motor inlet air pressures aid in controlling the air motor speed, the high degree of wrench head rotation velocity obtainable with the invention is primarily due to regulation of the air motor exhaust system. Conduit 178 is connected to the motor exhaust port and branches into two conduits, each communicating with adjustable flow control valves 180 and 182. The valve 180 exhausts to the atmosphere at all times and determines the speed of the air motor during low speed. The valve 182 is regulated to determine the high speed rotation of the air motor, and valves 180 and 182 will be operating simultaneously during fast or high speed rotation of the wrench head. A 2-way air operated valve 184 controlled by a solenoid S-7 may selectively shut off the flow of air through valve 182, and does so during the low speed operation of the air motor.

Therefore, upon the opening of contacts TA-1 and shifting of valve 160, the high pressure air will be introduced into the air motor as valve 170 is introducing high pressure into conduit 172. This air is exhausted through both flow valves 180 and 182 to produce high speed wrench head rotation. As the housing 26 continues downwardly, the cam 148 actuates switch LS-2, which energizes relay C to close contacts C-1 and thereby energizes solenoids S-6 and S-7. Solenoid S-6 shifts the spring biased valve 170 to permit lower air pressure to enter conduits 168 and 174 and flow into the motor 42. Solenoid S-7 shifts valve 184 to prevent the exhaust of the air motor outlet from flowing through flow valve 182 and, hence, the motor exhausts solely through valve 180. The wrench head 48 is now rotating slowly, and the switch LS-2 is positioned such that only the last two or three turns of the threaded part within the wrench socket are made at this slow speed.

The air pressure regulator 164 is preset, whereby the air motor will stall out at a torque somewhat less than the required final torque, and upon rotation of the air motor and wrench head terminating, the operator then closes the "rack forward" switch 136, which energizes relay D. Energization of relay D closes contacts D-1 to maintain the relay circuit, closes contacts D-2, opens normally closed contacts D-3 and D-4 to de-energize solenoids S-8, S-6 and S-7, and closes contacts D-5 to energize solenoid S-5, which shifts 4-way valve 186 to move the piston rod of cylinder 74 to the right as viewed in FIG. 7. As the rack moves to the right, the gear and clutch will be rotated to rotate the drive shaft 38. De-energizing solenoid S-8 prevents any air from being injected into the air motor and, hence, the air motor output drive is inactive and will idly rotate due to the rack produced rotation of the drive shaft. It will be appreciated that the unidirectional clutch prevents the gear 60 from rotating during the sequence of operation when the air motor is producing the driving torque.

The rack produced rotation of the wrench head 48 provides the final assembling torque, and as the rotation is slow, the effect of the inertia forces within the rotating elements is insignificant. The rotation of the wrench head under the rack operation continues until the air pressure reacting on the piston rod equals the forces opposing piston rod movement; namely, the resistance to further threading produced by the parts being assembled. By accurately adjusting the air pressure entering cylinder 74 by regulator 188, the point of rack "stall out" can be very accurately determined, and, hence, the final torque regulated.

Should the rack 62 require more than a single stroke to produce the required torque, as may occur due to a tight thread causing premature stall out of the slow speed air motor operation, means are provided to cause the rack to recycle. Upon the rack extending a predetermined distance, an abutment 190 mounted upon the rack 62 engages a switch LS-3 which energizes time delay relay TB, momentarily opening contacts TB-1, which de-energizes solenoid S-5, causing valve 186 to shift and return the rack to the left position. When contacts TB-1 close, solenoid S-5 is again energized to move the rack forward. This cycle will automatically repeat until the rack stalls out.

When the final torque has been achieved and rack movement ceases, the operator closes the "return to start" switch 138, which energizes relay E. Relay E maintains energized through the normally closed switch LS-5 and closed contacts E-4, and opens the normally closed contacts E-1, E-2, E-3 and E-6, which open the circuits to relays A, B, TA, D and solenoids S-3, S-5, S-6, S-7, S-8 and S-9, respectively. Simultaneously, the contacts E-5 close, and as the rack has retracted due to de-enerization of solenoid S-5, a normally open switch LS-6 is closed by rack abutment 190, the solenoid S-4 is energized to actuate valve 152 to cause cylinder 64 to raise the drive shaft housing 26 and return the housing to its uppermost position. The switch LS-4 is of the three position type, and upon being engaged by cam 146 during the upward housing movement, the solenoid S-2 is energized to shift valve 154 and unclamp the torque assembled part from the vise. Upon the cam 144 engaging switch LS-5, the circuit to relay E is opened and the machine is prepared for the next complete cycle.

If desired, a switch LS-7 may be employed to automatically return the housing 26 to the upper position. Switch LS-7 is located within the machine base 10 adjacent the abutment 132 of switch arm 130, and the abutment is adjusted whereby the switch is closed thereby at the same time as the rack "stalls out". This energizes relay E and produces the same result as manually closing switch 138.

As the vise 16 is rotatably mounted and restricted against rotation by the torque bar 116, the torque imposed on the parts to be assembled can readily be read from scale 126 and, hence, in originally setting up a particular job on the machine, the operator may refer to the torque scale to obtain the required rack cylinder pressure to obtain the desired torque.

The velocity at which the piston rods of cylinders 64, 68 and 174 operate is regulated by conventional adjustable flow-check valves 192 restricting the exhausting of the cylinders, and air lubricators 194 are used to insure smooth operation of the pneumatic components.

From the above description, it will be appreciated that interlock means are provided to prevent improper sequence of operation by the operator. Switch LS-1 prevents the knee switch 140 circuit from accidentally closing until the housing has moved down to the point where the wrench head socket is ready to be placed on the unclamped part. Switch LS-6 prevents the housing 26 and wrench head 48 from rising until the rack 62 is back, and, thus, both LS-1 and LS-6 function as safety interlocks.

It is intended that various sizes of rack cylinders be selectively employed with the invention to increase the range of torques obtainable within given air pressure limits. With parts requiring relatively small torques, a rack cylinder and piston of small effective pressure areas is preferred, whereby the torque produced can be controlled with 1 or 2 foot pounds. In applications requiring high torques, a cylinder having a large effective pressure area would be used to produce the rack movement. All sizes of cylinders would employ the mounting structure illustrated in FIGS. 3 and 4, and by employing a quick disconnect hose fitting, the desired cylinder may be installed very quickly.

It will be appreciated that the sequence and operation of the machine may be rendered more automatic than the described embodiment. For instance, by employing an air pressure operated switch sensitive to the working pressure within the air motor 42 at the time of the motor "stall out," the racking operation could be initialed automatically. Also, by slowly rotating the drive shaft 38 and wrench head 48 by the rack or air motor as the head and housing descend prior to connection to the unclamped threaded part, the wrench head socket could be aligned with the wrench flats of the part whereby manual operation of the knee switch would be unnecessary. However, these refinements would necessitate much expense for a small time savings and would only be feasible on a very high production machine which was assembling the same parts in long runs. It is also recognized that the machine of the invention could be modified by one skilled in the art to employ a hydraulic or fluid circuit rather than a pneumatic system. While this modification may be of some advantage if extremely accurate control of the piston rod velocities were desired, the added expense necessary with a fluid circuit would not normally be justified as the air system produces accurate results suitable for most assembly operations.

The machine of the invention is readily set up for a wide range of torque assembly operations. Once the positions of the switches LS–1, LS–2, LS–4 and LS–5 and the air pressures needed at the air motor and rack are determined for a particular job, a scale on the switch mounting support 142 permits the switches to be accurately located as desired, and gages on the pressure regulators readily control the air pressures. A tachometer 196 mounted on the front of housing permits the operator to determine the speed of rotation of the air motor during both high and low speed rotation.

We claim:

1. A torque machine for assembling threaded parts comprising a base member, a clamping member rotatably mounted on said base for gripping one of the parts to be assembled, a wrench head rotatably mounted upon said base and movable toward and away from said clamping member, means carried by said wrench head adapted to establish a torque transmitting connection with the ungripped threaded part to be assembled, first means for rotating said wrench head facilitating initial threading of parts, second means for rotating said wrench head for assembling said parts with a predetermined torque means resisting rotation of said clamping member and control means sensing rotation of said clamping member controlling termination of the operation of said second means.

2. In a machine for assembling threaded parts to a predetermined torque, a base, clamp means mounted on said base adapted to grip one of the parts to be assembled, a wrench head for connection to the other part to be assembled, means mounting said wrench head upon said base whereby said head may be rotated and translated toward and away from said clamp means, means adapted to move said head toward and away from said clamp means, first two-speed motor means rotating said head during initial threading of said parts, first control means for said first motor means selectively rotating said motor in high and low speed operation, second motor means rotating said head subsequent to operation of said first motor means to produce the final torque assembling said parts, and second control means for said second motor means.

3. In a machine for assembling threaded parts as in claim 2, wherein said high speed operation and the initiation of said low speed operation of said first motor means is controlled in dependence upon the location of said wrench head with respect to the clamped part and the termination of the low speed operation is dependent upon a predetermined resistance to rotation being imposed upon said wrench head by the parts being assembled.

4. In a machine for assembling threaded parts as in claim 2, wherein said second motor means rotates said wrench head slowly and termination of the operation of said second motor means is in dependence upon the torque assembling the threaded parts attaining a predetermined value.

5. In a machine for assembling threaded parts to a predetermined torque, a base, clamp means mounted on said base adapted to grip one of the parts to be assembled, guide means supported by said base parallel to the axis of the gripped part, a housing slidably supported on said guide means for movement toward and away from said clamp means, a drive shaft rotatably journaled in said housing concentric to the axis of the gripped part, a wrench head keyed to said drive shaft adapted to drivingly associated with the part to be threaded upon the clamped part, a first motor mounted on said housing drivingly associated with said drive shaft, a second motor mounted on said housing drivingly associated with said drive shaft, motive means translating said housing upon said guide means, and control means operatively associated with said first and second motors and said motive means whereby said wrench head may be connected to the unclamped part and preliminarily threaded thereon by said first motor, and said second motor produces the predetermined torque assembly of the parts.

6. In a machine for assembling threaded parts as in claim 5, wherein said first motor is of the rotary type, said second motor comprises a cylinder and piston and said motive means comprises a cylinder and piston.

7. In a machine for assembling threaded parts as in claim 5, wherein said first motor has an initial high speed operation and a subsequent low speed operation and said second motor is inactive until termination of the low speed operation.

8. In a machine for assembling threaded parts as in claim 5, wherein a unidirectional clutch is drivingly associated with said drive shaft, a gear driving said clutch and a gear rack drivingly engaging said gear, said second motor being drivingly associated with said rack to produce linear translation thereof and rotate said clutch.

9. In a machine for assembling threaded parts as in claim 7, wherein said high speed operation and the initiation of said low speed operation of said first motor is controlled in dependence upon the location of said housing with respect to the clamped part and the termination of said low speed operation is dependent upon a predetermined resistance to rotation being imposed on said drive shaft and wrench head by the parts being assembled.

10. In a machine for assembling threaded parts as in claim 9, wherein termination of the operation of said second motor is dependent upon a predetermined resistance to rotation of the drive shaft and wrench head produced by the parts being assembled.

11. In a machine for assembling threaded parts to a predetermined torque, a base, a vise mounted upon said base adapted to clamp one of the parts to be assembled, means including first switch means operating said vise, guide means supported on said base, a housing slidably supported on said guide means for movement toward and away from said vise, means for moving said housing upon said guide means, control means including second, third and fourth switch means controlling said moving means, a drive shaft rotatably journaled in said housing concentric to the axis of the threaded part clamped in said vise, a two-speed rotary motor mounted on said housing in driving connection with said drive shaft, control means associated with said motor selectively shifting said motor to high and low speed operations including a time delay switch and fifth switch means, respectively, a one-way clutch in unidirectional driving engagement with said drive shaft, a gear fixed to said clutch for the rotation thereof, a rack movably supported on said housing in mesh with said gear, an expandable chamber motor mounted on said housing operatively connected to said rack, control means for said expandable chamber motor including sixth, seventh and eighth switch means, and switch actuating means mounted on said housing whereby closing of said second switch causes said housing to move toward said vise, whereupon said first switch is operated by said switch actuating means to operate said vise to grip one of the parts to be assembled, closing of said third switch energizes said time delay switch to initiate high speed operation of said rotary motor, closing of said fifth switch by said actuating means shifts said motor to low speed rotation, closing of said sixth switch after termination of said motor rotation causes said rack to rotate said clutch and wrench head, and closing of said fourth switch moves said head away from the vise wherein said actuating means actuates said first switch to unclamp the assembled part from the vise.

12. In a machine for assembling threaded parts as in claim 11, wherein removable stop means engage said housing upon said wrench head engaging the unclamped part to be assembled, and prevents further movement thereof toward the vise until closing of said third switch.

13. In a machine for assembling threaded parts as in claim 11, wherein said seventh switch is closed by said rack upon said rack moving a predetermined distance to recycle said expandable chamber motor and said eighth switch renders the circuit returning said housing controlled by said fourth switch inactive until said rack is in the retracted position.

14. In a machine for assembling threaded parts as in claim 11, wherein quick disconnecting means are employed in mounting said expandable chamber motor upon said housing and the connection with said rack.

15. In a machine for assembling threaded parts as in claim 11, wherein said vise is mounted on a shaft concentric to said drive shaft, bearing means rotatably supporting said shaft in said base, and a torque bar including torque indicating means interposed between said shaft and said base.

16. In a machine for assembling threaded parts as in claim 15, wherein switch actuating means are connected to said vise supporting shaft for closing the circuit operated by said fourth switch upon a predetermined degree of rotation of said shaft.

References Cited in the file of this patent
UNITED STATES PATENTS

| | | |
|---|---|---|
| 2,616,323 | Leifer | Nov. 4, 1952 |
| 2,627,770 | Hautan et al. | Feb. 10, 1953 |
| 2,678,576 | Thompson | May 18, 1954 |
| 2,691,314 | Stevens et al. | Oct. 12, 1954 |
| 2,720,803 | Rice et al. | Oct. 18, 1955 |
| 2,740,507 | Shaff | Apr. 3, 1956 |
| 2,796,789 | Rice et al. | June 25, 1957 |
| 2,833,321 | Hantan et al. | May 6, 1958 |
| 2,835,365 | Rice et al. | May 20, 1958 |
| 2,867,144 | Stevens | Jan. 6, 1959 |
| 2,880,770 | Ettinger | Apr. 7, 1959 |
| 2,882,773 | Wing | Apr. 21, 1959 |
| 2,893,278 | Rice | July 7, 1959 |
| 2,900,856 | Maier | Aug. 25, 1959 |
| 2,928,302 | Owen et al. | Mar. 15, 1960 |
| 2,952,176 | Mitchel | Sept. 13, 1960 |
| 2,953,902 | Skoog et al. | Sept. 27, 1960 |
| 2,963,134 | Banner | Dec. 6, 1960 |
| 2,964,152 | Banner | Dec. 13, 1960 |